(No Model.)

H. S. PARK.
VALVE FOR AIR BRAKES.

No. 583,292. Patented May 25, 1897.

3 Sheets—Sheet 1.

Witnesses:
J. R. Andrews
O. W. Bond

Inventor:
Harvey S. Park (No Model.)  
H. S. PARK.  
VALVE FOR AIR BRAKES.

3 Sheets—Sheet 2.

No. 583,292.   Patented May 25, 1897.

Witnesses  
J. R. Andrews  
O. W. Bond

Inventor:  
Harvey S. Park (No Model.) 3 Sheets—Sheet 3.
H. S. PARK.
VALVE FOR AIR BRAKES.
No. 583,292. Patented May 25, 1897.
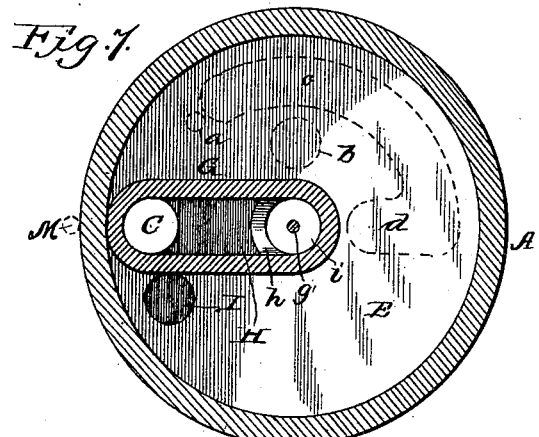
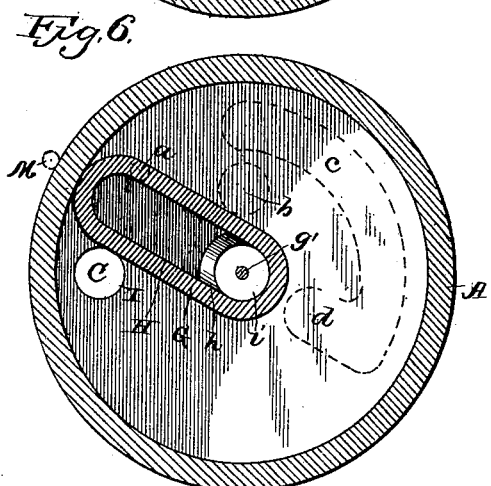
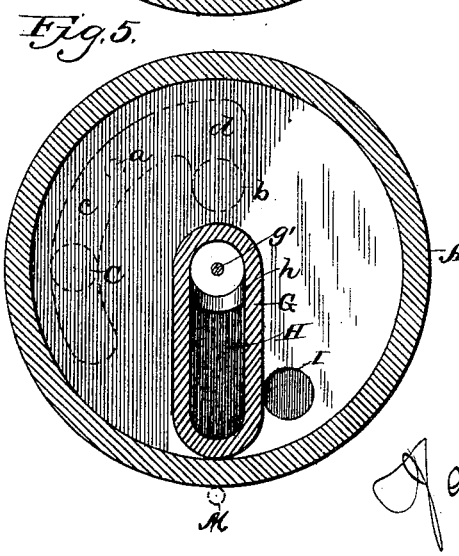
Witnesses
J. R. Andrews
O. W. Bond
Inventor:
Harvey S. Park

UNITED STATES PATENT OFFICE.

HARVEY S. PARK, OF CHICAGO, ILLINOIS, ASSIGNOR TO THE WESTINGHOUSE AIR BRAKE COMPANY, OF PITTSBURG, PENNSYLVANIA.

VALVE FOR AIR-BRAKES.

SPECIFICATION forming part of Letters Patent No. 583,292, dated May 25, 1897.

Application filed March 7, 1890. Serial No. 343,049. (No model.)

*To all whom it may concern:*

Be it known that I, HARVEY S. PARK, a citizen of the United States, residing at Chicago, in the county of Cook and State of Illinois, have invented certain new and useful Improvements in Engineers' Valves for Air-Brakes; and I do hereby declare that the following is a full, clear, and exact description of the invention, which will enable others skilled in the art to which it pertains to make and use the same, reference being had to the accompanying drawings, forming a part hereof, in which—

Figure 1:
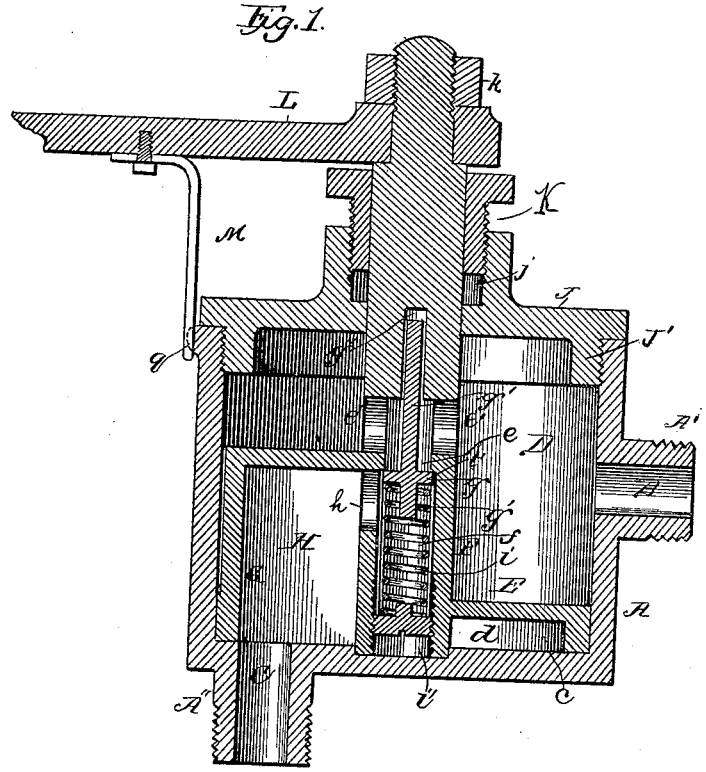
Figure 2:
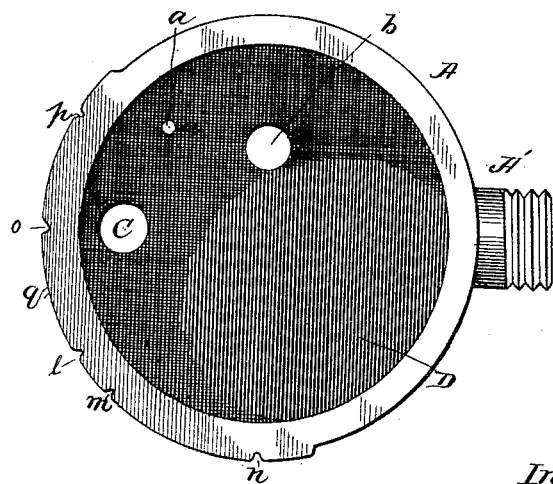

Figure 1 is a sectional elevation. Fig. 2 is an inside view of the outer shell, looking toward the bottom. Figs. 3, 4, 5, 6, and 7 are cross-sections showing the several positions of the parts in use.

This invention relates to what are known as or termed "engineers' valves," for use in connection with air-brakes, and has for its objects to improve the construction and operation of such valves, to insure a positive shut-off of the pressure from the locomotive-reservoir at a given point, to prevent the flow of air through the valve until the resistance at which the check-valve is set has been overcome, to retain a pressure in the valve to a certain amount, and to improve the construction of the parts which govern the flow of air through the valve; and its nature consists in the several parts and combinations of parts hereinafter described, and pointed out in the claims as new.

In the drawings, A represents the casing or cylinder, having on one side a nipple A' and on one end a nipple A", the nipple A' being for attachment to a pipe leading to the locomotive-reservoir, and the nipple A" being for the attachment of a pipe which connects with the train-pipe.

B is an opening through the nipple A' and the wall of the cylinder A.

C is an opening through the nipple A" and the bottom of the cylinder A.

D is the chamber within the cylinder A, and through the bottom of the cylinder A is a small opening $a$ and an opening $b$ of larger diameter, as shown in Fig. 2.

E is a circular disk or plate of a diameter to fit snugly within the chamber D and having on its under face a semicircular groove $c$, terminating at one end in a groove or recess $d$, extending inward toward the center of the disk E, as shown by the dotted lines in Figs. 3, 4, 5, 6, and 7, and the groove or recess $c$ is on the arc of a circle to pass over the opening. C and the hole $a$, and the side groove or recess $d$ is formed to pass over the opening $b$ as the plate or disk is turned.

F is a stem formed with or attached to the plate or disk E and extending up above the top of the cylinder A, as shown in Fig. 1. The portion of the stem F lying within the chamber D has an interior chamber $f$, and communication is had with the chamber D and chamber $f$ by a port $e$ and openings $e'$ in the stem F, as shown in Fig. 1. A valve $g$ is located in the chamber $f$ and seats against a wall $f'$ in the chamber $f$ to close the port $e$, and this valve $g$ has a stem $g'$ projecting on both sides, one end of which enters and is guided by a hole $g''$ in the stem F. The valve $g$ is held to its seat by a coiled spring $i$, and the resistance or pressure of the coiled spring is adjusted by a nut $i'$, which screw-threads into the end of the stem F, closing the end of the chamber $f$, as well as forming a support for the end of the spring $i$.

G is a wall or casing extending out and down from the stem F and united with the stem F and the plate or disk E.

H is a chamber within the wall G and having communication with the chamber $f$ below the valve $g$ by a hole or opening $h$, as shown in Fig. 1.

I is a hole through the plate E on one side of the wall G.

J is a cap or cover for closing the end of the chamber D, for which purpose the cap or cover has a depending flange J' with a screw-thread to enter the end of the cylinder A and form an air-tight joint.

K is a plug screw-threaded into the cap or cover J, with a packing $j$ between its end and the bottom of the chamber, into which it screws around the stem F to make an air-tight joint around the stem F.

L is a handle slipped onto the end of the stem F and held in place by a nut $k$.

M is a spring attached to the handle L and extending down for its end to engage with a series of notches $l\ m\ n\ o\ p$ in a rim $q$, formed on the upper end of the cylinder A on one side of such cylinder, as shown in Fig. 2.

The parts are assembled by placing the valve $g$ in the chamber $f$ for its stem $g'$ to enter the hole $g''$ and then inserting the spring $i$ and setting the spring to any desired resistance by screwing up the nut $i'$. The disk E is entered into the chamber D, fitting snugly therein. The cap or cover J is screwed into place on the end of the cylinder A. The plug K is screwed into place to compress the packing $j$ around the stem F, and the lever or handle L, with the spring M, is slipped onto the end of the stem F, and there secured by the nut $k$, and when so arranged the valve is ready for use by connecting the nipple A' with the locomotive-reservoir pipe and the nipple A'' with the pipe which connects with the train.

Figure 3:
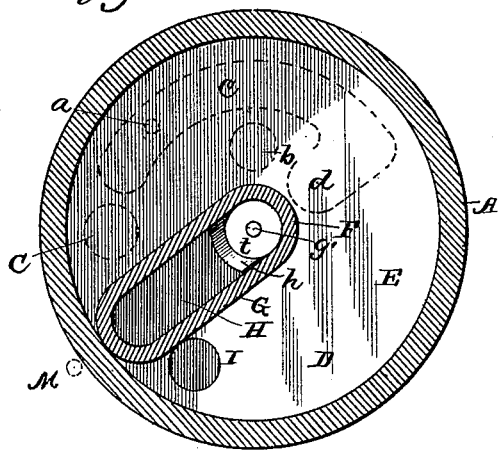
Figure 4:
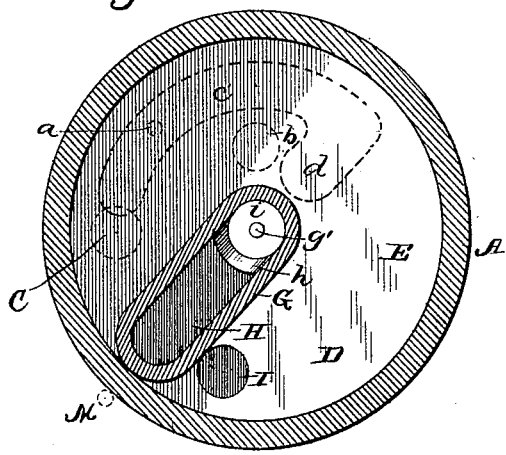

In use the lever L is turned for the spring M to engage with the notch $l$, and in this movement the disk or plate E is turned by the stem F, carrying with it the wall G and bringing the parts into the position shown in Fig. 3, in which position the chamber H is clear of the opening C and the recess $c$ is not in communication with the opening C, the parts being on what is known or termed the "lap," in which position communication is entirely shut off, both from the locomotive-reservoir and the train-pipe. A slight turning of the lever L to the right brings the spring M into engagement with the notch $m$ and turns the plate or disk E and the wall G thereon to bring the recess $c$ into communication with the opening C, as shown in Fig. 4, making a connection between the opening C and the hole $a$, by which an escape of air from the train-pipe is had, the air passing from the train-pipe through the opening C into the recess $c$ and thence out through the hole $a$, applying the brakes with what is known or termed a "grading" pressure, and when a sufficient pressure on the brakes is had the turning of the lever L to the left brings the spring M into engagement with the notch $l$ and returns the parts to the position shown in Fig. 3, holding the brakes at a grading pressure. A further turning of the lever L to the right brings the spring M into engagement with the notch $n$, turning the plate or disk E and the wall G into the position shown in Fig. 5, in which position the recess $c$ is over the hole C at one end and over the hole $a$, and the side recess $d$ is over the hole $b$, allowing a free escape of the air from the train-pipe, the air passing from the train-pipe out through the hole C into the recesses $c$ and $d$, and out through the holes $a$ and $b$, which sets the brakes for what is known or termed the "emergency stop," which is the full pressure of the air in the auxiliary reservoir, and by bringing the lever L back to the left for the spring M to engage the notch $l$ the brakes will be held for their full pressure.

The turning of the lever L to the left for the spring M to engage with the notch $o$ turns the plate or disk E and the wall G into the position shown in Fig. 7, in which position the chamber H is over the opening C, and communication is established between the locomotive-reservoir and the train-pipe for air to pass from such reservoir into the train-pipe and charge the reservoirs with a pressure governed by the resistance of the spring $i$. The air from the locomotive-reservoir enters the chamber D through the opening B and flows into the holes $e'$ and port $e$, pressing down on the valve $g$, overcoming the resistance of the spring $i$ and opening the valve $g$ for air to enter the chamber $f$ and pass through the opening $h$ into the chamber H and thence through the opening C and the connecting-pipe into the train-pipe, and such flow of air from the engine-reservoir will continue until the pressure in the train-pipe has been increased sufficiently for the spring $i$ and the pressure in the train-pipe to overcome the pressure of the air on the valve $g$, for the spring and train-pipe pressure to close such valve and shut off the flow of air through the opening $h$ into the chamber H, thereby charging the reservoirs on the cars to the pressure for which the spring $i$ is set, to close the valve $g$. The turning of the lever L still farther to the left brings the spring M into engagement with the notch $p$, which turns the plate or disk E and the wall G into the position shown in Fig. 6, in which position the hole I in the plate or disk E is in line with the opening C for air to pass from the locomotive-reservoir through the opening B into the chamber D and thence out through the opening I and passage C and the connecting-pipe therefor into the train-pipe to charge the auxiliary reservoirs with the full pressure of the locomotive-reservoir, and when so charged the lever L is turned to the right to engage the spring M with the notch $l$, bringing the parts into the position shown in Fig. 3 and holding the auxiliary reservoir charged to the full capacity of the locomotive-reservoir pressure, and the lever is also turned to the left from this position for the spring M to engage the notch $l$ after the reservoirs have been charged with the pressure, when the parts are in the position shown in Fig. 7, which has the pressure governed by the spring $i$.

The pressure from the locomotive-reservoir is always in the chamber D above the plate or disk E, and such pressure acts to hold the plate on the bottom of the cylinder A, so as to insure a close contact between the bottom of the plate or disk and the face of the bottom of the cylinder, and at the same time this pressure does not interfere in any manner with the easy turning of the plate or disk E through the stem F and lever L. The grooves or recesses $c$ and $d$ in the bottom face of the plate or disk E furnishes the means for connecting the passage C with the vent-holes $a$ and $b$, and as the vent-hole $b$ cannot be connected until the end recess $d$ is brought thereover it will be seen that until this is done a grading pressure will only be applied, as the vent is through the small hole $a$, and when an emergency stop is required both the vent-holes $a$ and $b$ are brought into use, giving a large opening for venting the train-pipe to apply the brakes.

The valve as a whole is very simple and at the same time will be found effectual and reliable in use, and by its use the auxiliary reservoirs can be charged with a full pressure by simply turning the plate or disk E, or they can be charged with a reduced pressure by having the air from the locomotive-reservoir pass through the openings $e$, chamber $f$, opening $h$, and chamber H, and this can be done without any change in the parts which compose the valve and by simply turning the plate or disk E for the desired communication either through the opening I or through the chamber H with the passage C.

What I claim as new, and desire to secure by Letters Patent, is—

1. The combination, in an engineer's air-brake valve, of a chamber having inlet and outlet passages, a disk in said chamber, a stem carrying the disk and having an interior chamber or passage forming a communication between the inlet and outlet passages, a port between the inlet and outlet of the stem-chamber, and a resistance-valve controlling the port, substantially as and for the purposes specified.

2. The combination in an engineer's brake-valve, of a chamber having an inlet-passage, a passage communicating with the train-pipe, and vent-passages of different sizes opening to the atmosphere, and a valve in said chamber having an escape groove, or recess, for connecting one or both of the vent-passages with the train-pipe passage, substantially as set forth.

3. The combination, in an engineer's air-brake valve, of a chamber having inlet and outlet passages, a disk in said chamber, a chamber on the disk having an outlet, a stem carrying the disk and having an interior chamber communicating with the main chamber and the disk-chamber, and a resistance-valve controlling the communication between the two chambers, substantially as and for the purposes specified.

4. The combination, in an engineer's valve, of a chamber having an inlet and outlet passage, and vent-holes of different sizes opening to the atmosphere, a disk in said chamber having an escape groove or recess furnishing a communication between one or both of the vent-holes and the chamber-outlet passage, and a stem carrying the disk, substantially as and for the purposes specified.

5. The combination, in an engineer's valve, of a chamber having inlet and outlet passages and vent-holes, a disk in said chamber having an escape groove or recess connecting the outlet-passage and vent-holes of the chamber, a chamber on said disk having an outlet-opening through the disk, a stem carrying the disk and having an interior chamber communicating with the main chamber and the disk-chamber, and a resistance-valve controlling the communication between the two chambers, substantially as and for the purposes specified.

6. The combination, in an engineer's valve of a chamber having inlet and outlet passages, a disk in said chamber having an opening through it connecting with the outlet-passage of the chamber, and a chamber on the disk communicating with the main chamber and its outlet-passage, substantially as and for the purposes specified.

7. The combination, in an engineer's valve, of a chamber having inlet and outlet passages, a disk in said chamber with an opening through it connecting the chamber and its outlet-passage, a chamber on the disk communicating with the outlet-passage of the main chamber, and a stem carrying the disk and having a passage communicating with the main chamber and the disk-chamber substantially as and for the purposes specified.

8. The combination, in an engineer's valve of a chamber having inlet and outlet passages and vent-holes, a disk in said chamber having an escape groove or recess connecting the outlet-passage and vent-holes of the chamber, a chamber on the disk communicating with the main chamber and its outlet-passage, and an opening through the disk connecting the main chamber and its outlet-passage, substantially as and for the purposes specified.

9. The combination, in an engineer's valve, of a chamber having inlet and outlet passages, a disk in said chamber, a chamber on said disk having a communication with the outlet-passage of the main chamber, and a valve controlling communication between the main chamber and the disk-chamber, substantially as and for the purposes specified.

10. The combination, in an engineer's valve, of a chamber having inlet and outlet passages, a disk in said chamber having an opening through it connecting with the outlet-passage of the chamber, and a chamber on the disk with valve-controlled communication between it and the main chamber, substantially as and for the purposes specified.

11. The combination, in an engineer's valve, of a chamber having inlet and outlet passages and vent-holes, a disk in said chamber having an opening through it connecting with the outlet-passage of the chamber, and having a relief groove or recess connecting the vent-holes with the outlet-passage of the chamber, a chamber on the disk and a valve-controlled communication between the main chamber and the disk-chamber, substantially as and for the purposes specified.

12. The combination, in an engineer's valve, of a chamber having inlet and outlet passages, a stem in said chamber having an interior chamber communicating with the main chamber, a chamber communicating with the stem-chamber and the outlet-passage of the main chamber, and a valve controlling the communication with the stem-chamber and the main chamber, substantially as and for the purposes specified.

13. The combination, in an engineer's valve, of a chamber having inlet and outlet passages, a stem in said chamber, a disk on the stem, a chamber in the stem, a port communicating with the main chamber and the stem-chamber, a valve for the port always exposed to pressure from the inlet-passage, and a resistance-spring for closing the valve, substantially as and for the purposes specified.

14. The combination, in an engineer's valve, of a chamber having inlet and outlet passages, a stem in said chamber, a chamber in said stem, a port communicating with the main chamber and the stem-chamber, a valve for the port, a resistance-spring for closing the valve, and a chamber communicating with the stem-chamber and the outlet-passage for the main chamber, substantially as and for the purposes specified.

15. The combination, in an engineer's valve having inlet and outlet passages, of a disk, a stem carrying the disk, a chamber in the stem and a chamber on the disk communicating with the stem-chamber, said stem and disk chambers forming communication between the inlet and outlet passages, substantially as and for the purposes specified.

16. The combination, in an engineer's valve having inlet and outlet passages, of a disk, a stem carrying the disk, a chamber in the stem, a valve controlling the admission of air to the stem-chamber, and a chamber on the disk communicating with the stem-chamber, said stem and disk chambers forming communication between the inlet and outlet passages, substantially as and for the purposes specified.

17. The combination in an engineer's valve, of a chamber having inlet and outlet passages and vent-holes, a disk in said chamber having a hole through it connecting with the outlet-passage of the main chamber, and having a relief groove or recess connecting the vent-holes and the outlet-passage of the main chamber, a stem carrying the disk and having an interior chamber, a port for the stem-chamber, a valve for the port, a resistance-spring for the valve, a chamber on the disk communicating with the stem-chamber and the outlet-passage of the main chamber, a handle for the stem, and a series of notches for adjusting the handle, substantially as and for the purposes specified.

HARVEY S. PARK.

Witnesses:
  O. W. BOND,
  J. R. ANDREWS.